United States Patent
Sirpal et al.

(10) Patent No.: US 10,116,602 B2
(45) Date of Patent: *Oct. 30, 2018

(54) SYSTEM AND METHODS FOR DEVICE TO DEVICE CONTROL

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao (CN)

(72) Inventors: Sanjiv Sirpal, Oakville (CA); Mohammed Selim, Oakville (CA); Alexander De Paz, Burlington (CA); Salvador Soto, Toronto (CA); Sergii Grysenko, Burlington (CA)

(73) Assignees: JAMDEO CANADA LTD., Ontario (CA); HISENSE INTERNATIONAL CO., LTD., Qingdao (CN); HISENSE USA CORP., Suwanee, GA (US); QINGDAO HISENSE ELECTRONICS CO., LTD., Qingdao (CN)

( * ) Notice: Subject to any disclaimer, the term of this patent is extended or adjusted under 35 U.S.C. 154(b) by 346 days.

This patent is subject to a terminal disclaimer.

(21) Appl. No.: 14/829,955

(22) Filed: Aug. 19, 2015

(65) Prior Publication Data
US 2016/0234064 A1 Aug. 11, 2016

Related U.S. Application Data

(60) Provisional application No. 62/113,225, filed on Feb. 6, 2015.

(51) Int. Cl.
*H04L 12/58* (2006.01)
*H04L 29/08* (2006.01)
(Continued)

(52) U.S. Cl.
CPC ............ *H04L 51/046* (2013.01); *G06F 3/017* (2013.01); *G06F 3/0481* (2013.01);
(Continued)

(58) Field of Classification Search
CPC ............... H04L 51/046; H04L 41/0803; H04L 41/0806; H04L 41/22; H04L 67/303; H04L 67/306
(Continued)

(56) References Cited

U.S. PATENT DOCUMENTS

| 6,874,029 | B2 * | 3/2005 | Hutcheson | .......... G07F 17/3295 709/227 |
| 7,162,238 | B1 * | 1/2007 | Massie | .................. H04W 24/00 455/428 |

(Continued)

*Primary Examiner* — Davoud A Zand
(74) *Attorney, Agent, or Firm* — Gordon & Rees LLP

(57) ABSTRACT

The present disclosure relates to systems, methods, electronic devices and applications for device to device control by way of an application layer protocol. In one embodiment, device to device control includes establishing a connection with a second device, the second device identified by an application, determining one or more capabilities of the second device based on a capability matching of the application, wherein determining is based on an application profile for the second device and capabilities output by the second device and controlling operation based on one or more matched capabilities.

20 Claims, 7 Drawing Sheets

(51) Int. Cl.
*G06F 3/0482* (2013.01)
*G06F 3/0484* (2013.01)
*G06F 3/0485* (2013.01)
*H04L 12/24* (2006.01)
*G06F 3/0488* (2013.01)
*G06F 3/0481* (2013.01)
*G06F 3/01* (2006.01)
*G06F 3/14* (2006.01)
*G09G 5/00* (2006.01)
*H04N 21/426* (2011.01)
*H04N 21/458* (2011.01)
*H04N 21/482* (2011.01)
*H04N 21/488* (2011.01)
*H04N 21/81* (2011.01)
*H04N 21/4402* (2011.01)
*H04N 21/442* (2011.01)
*H04N 21/45* (2011.01)
*H04L 12/28* (2006.01)

(52) U.S. Cl.
CPC ......... *G06F 3/0482* (2013.01); *G06F 3/0485* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/1415* (2013.01); *G09G 5/005* (2013.01); *H04L 12/2807* (2013.01); *H04L 41/0806* (2013.01); *H04L 41/12* (2013.01); *H04L 41/22* (2013.01); *H04L 67/303* (2013.01); *H04L 67/306* (2013.01); *H04N 21/42653* (2013.01); *H04N 21/4402* (2013.01); *H04N 21/44227* (2013.01); *H04N 21/458* (2013.01); *H04N 21/4516* (2013.01); *H04N 21/4826* (2013.01); *H04N 21/4882* (2013.01); *H04N 21/812* (2013.01); *G09G 2354/00* (2013.01)

(58) Field of Classification Search
USPC ........ 709/201, 202, 203, 204, 205, 206, 220
See application file for complete search history.

(56) References Cited

U.S. PATENT DOCUMENTS

| | | | | |
|---|---|---|---|---|
| 7,730,482 | B2* | 6/2010 | Illowsky | G06F 1/3203 717/177 |
| 8,769,122 | B2* | 7/2014 | Hutcheson | G07F 17/3295 709/228 |
| 9,671,851 | B2* | 6/2017 | Luna | G06F 1/3231 |
| 2002/0131404 | A1* | 9/2002 | Mehta | G06F 8/61 370/352 |
| 2004/0019683 | A1* | 1/2004 | Lee | H04L 29/06 709/227 |
| 2009/0065571 | A1* | 3/2009 | Jain | G06K 19/07739 235/379 |
| 2010/0173695 | A1* | 7/2010 | Hutcheson | G07F 17/3295 463/23 |
| 2011/0276396 | A1* | 11/2011 | Rathod | G06F 17/30867 705/14.49 |
| 2012/0069131 | A1* | 3/2012 | Abelow | G06Q 10/067 348/14.01 |
| 2013/0167196 | A1* | 6/2013 | Spencer | H04W 8/22 726/3 |
| 2013/0204962 | A1* | 8/2013 | Estevez | H04N 7/185 709/217 |
| 2015/0118958 | A1* | 4/2015 | Jain | G06Q 20/204 455/41.1 |
| 2015/0127733 | A1* | 5/2015 | Ding | H04W 4/08 709/204 |
| 2016/0103911 | A1* | 4/2016 | Logue | H04L 67/141 707/695 |

* cited by examiner

SYSTEM AND METHODS FOR DEVICE TO DEVICE CONTROL

CROSS REFERENCES TO RELATED APPLICATIONS

This application claims the benefit of U.S. provisional patent application No. 62/113,225 filed Apr. 13, 2014, entitled "SYSTEM AND METHODS FOR AN APPLICATION CONFIGURATION AND PRESENTATION," which is hereby incorporated by reference in its entirety.

This application is related to the concurrently filed applications entitled: SYSTEM AND METHODS FOR APPLICATION USER INTERFACE PRESENTATION AND CARD ELEMENTS filed on Aug. 19, 2015 and assigned patent application Ser. No. 14/829,886; SYSTEM AND METHODS FOR CARD ELEMENT APPLICATION OPERATION filed on Aug. 19, 2015 and assigned patent application Ser. No. 14/829,893; SYSTEM AND METHODS FOR CARD EXCHANGE AND USER INTERFACE PRESENTATION filed on Aug. 19, 2015 and assigned patent application Ser. No. 14/829,904; SYSTEM AND METHODS FOR CONTROL OF CARD ELEMENTS WITHIN AN APPLICATION USER INTERFACE filed on Aug. 19, 2015 and assigned patent application Ser. No. 14/829,914; SYSTEM AND METHODS FOR CARD INTERACTION AND ASSIGNING CARDS TO DEVICES filed on Aug. 19, 2015 and assigned patent application Ser. No. 14/829,923 SYSTEM AND METHODS FOR CARD INTERACTION AND ASSIGNING CARDS TO SPACES filed on Aug. 19, 2015 and assigned patent application Ser. No. 14/829,930; SYSTEMS AND METHODS FOR CONNECT TO CONTROL filed on Aug. 19, 2015 and assigned patent application Ser. No. 14/829,942; SYSTEM AND METHODS FOR SETTINGS CARDS filed on Aug. 19, 2015 and assigned patent application Ser. No. 14/829,970; and SYSTEM AND METHODS FOR PRESENTATION OF A USER INTERFACE AND CARD ELEMENTS filed on Aug. 19, 2015 and assigned patent application Ser. No. 14/829,986, the disclosures of which are expressly incorporated by reference.

FIELD

The present disclosure relates to electronic devices and applications, and more particularly to systems, devices and methods for configuring interaction between devices and applications.

BACKGROUND

Devices and systems increasingly operate on digital landscapes to control their operations. Communication with and control of these devices and systems is through protocols and languages that are frequently unique to the device and system. Devices and systems are preconfigured for particular communication arrangements that do not facilitate communication with other devices and systems that do not share similar prearranged communication protocols. Devices do not share resources with, or dictate performance output relative to or between, other devices. Methods and systems to enable communication and control across devices and systems that are preconfigured without compatible communication are needed.

BRIEF SUMMARY OF THE EMBODIMENTS

Disclosed herein are methods and systems for device to device communication and control. One embodiment of the present disclosure is directed to a method for device to device control. The method includes executing, by a device, an application configured to provide the device connection and interoperability with at least one other device associated with the application, establishing, by the device, a connection with a second device, wherein the second device is identified to the device by the application, and determining, by the device, one or more capabilities of the second device based on a capability matching of the application, wherein determining is based on an application profile for the second device and capabilities output by the second device. The method also includes controlling, by the device, an operation based on one or more matched capabilities, wherein a command is exchanged relative the device and second device by way of communication protocols established by the application.

In one embodiment, application operates on a platform executed by the device, the application configured to provide control and command relative to one or more other devices and to interoperate with one or more platforms of the one or more other devices.

In one embodiment, establishing includes a discovery of the second device by the first device, reciting profile data for the second device by way of the application and receiving capabilities of the second device by way of the application.

In one embodiment, the one or more capabilities of the second device are at least one of a function performed by the second device, information detected by the second device and communication configuration for the second device.

In one embodiment, the operation based on one or more capabilities includes transmission of a command by the device to the second device to request information detected by the second device.

In one embodiment, the operation based on one or more capabilities includes controlling the first device operation based on data received from the second device.

In one embodiment, controlling is based on the application formatting commands from the first device with plugins for the control of the second device.

In one embodiment, the device and second device share resources based on the connection.

In one embodiment, controlling includes modifying, by the device, operation based on information and data received from the second device.

In one embodiment, controlling includes transmitting data detected by the device to the second device.

On embodiment is directed to a device including a controller configured to execute an application configured to provide the device connection and interoperability with at least one other device associated with the application, establish a connection with a second device, wherein the second device is identified to the device by the application, and determine one or more capabilities of the second device based on a capability matching of the application, wherein determining is based on an application profile for the second device and capabilities output by the second device. The controller can also control an operation based on one or more matched capabilities, wherein a command is exchanged relative the device and second device by way of communication protocols established by the application.

Other aspects, features, and techniques will be apparent to one skilled in the relevant art in view of the following figures and detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
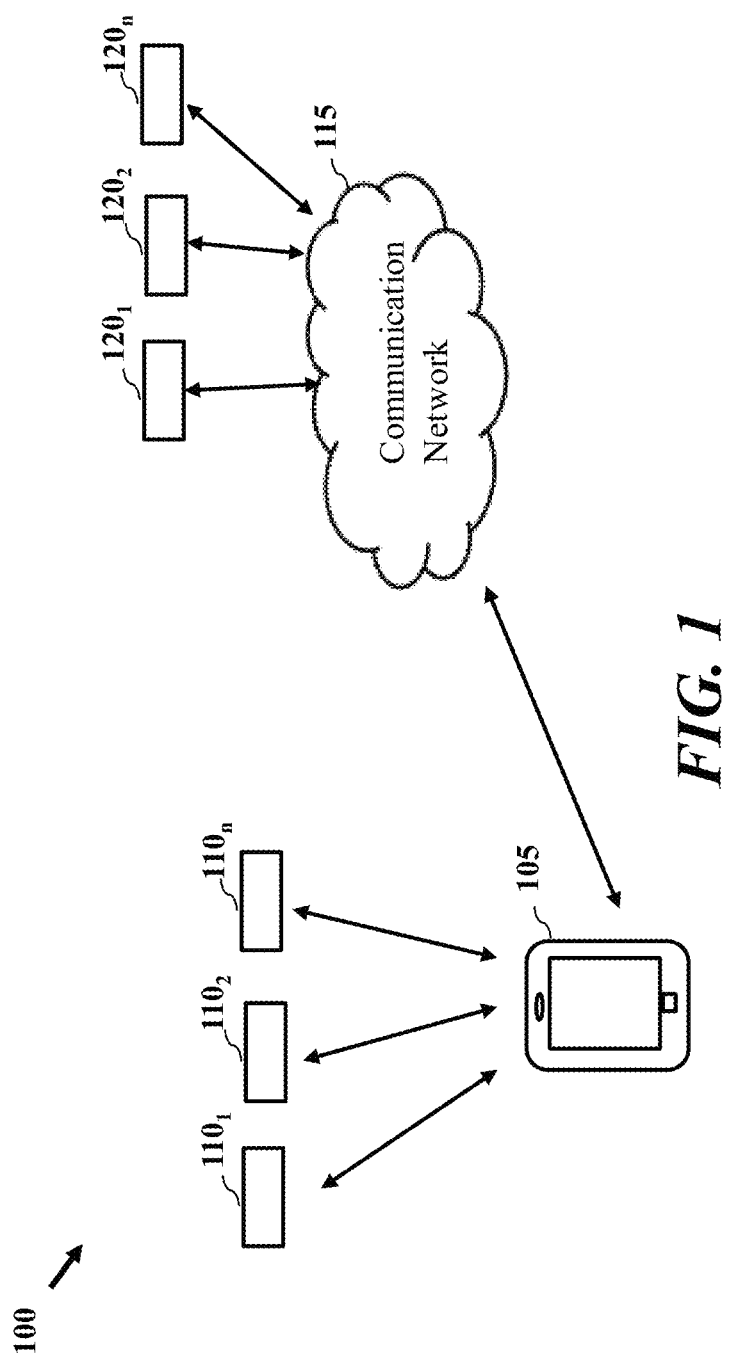
FIG. 1 depicts a simplified system diagram according to one or more embodiments.

One aspect of the disclosure is to provide systems, methods, devices and applications for connecting devices for interaction through a common communication protocol. In one embodiment, an application layer protocol, such as mobile operating system/experience (MOX), is provided. Other embodiments are directed to application functions. Other embodiments are directed to configuration of an application to provide one or more device functions.

One aspect of the disclosure is to provide methods and devices for card interaction and assigning cards to devices. In one embodiment, a mobile operating system/experience (MOX) application is provided for card interaction and assigning cards. In another embodiment, a device is disclosed for facilitating card interaction and assigning cards. In another embodiment, a system is provided for allowing card assignment to devices. Other embodiments are directed to presentation of a user interface and processes for method is disclosed for creating the cards for use in the MOX application.

One or more embodiments described herein are directed to communication with devices and interoperability of devices by way of an application configured to execute on the one or more devices. The application, which may be a MOX application, may be configured to present a user interface with graphical elements to represent entities (e.g., devices, spaces, etc.) and card elements. The user interface may also be configured to allow for manipulation of the card elements, such that assignment of a card to a device within the user interfaces results in an association of a card element to the device within the application. In that fashion, representations in the user interface can result in associations of data by devices running the application (e.g., MOX application).

As used herein, a card can relate to graphical elements displayed in a user interface, wherein each card element can allow for one or more of exchange, communication, control and/or application accessibility. Card elements may be associated with one or more types of cards and one or more types of capabilities. A card element may have a data structure associated with each card type, the card providing metadata that can allow an application and/or devices to utilize the card. According to one embodiment, each card element can include a graphical element that is represented by a device and/or can include a data record stored by one or more servers or devices that allow for the card to be shared, transmitted, loaned, exchanged, associated, pulled and/or pushed to one or more devices and spaces. Card elements may define capabilities of devices and/or spaces. Card elements may be associated with devices or spaces that are real or virtual. Card elements may be uniquely identified.

As used herein, a MOX application relates to an application having particular core elements that allow for the application to be executed across many different devices and devices types. The application may be platform agnostic and thus, configurable on one or more operating systems or platform types (e.g., linux, etc.). The MOX application provides connectivity, control and/or communication relative to one or more devices. The MOX application can be operated based on communication with a network and/or pear-to-pear communication among devices. The MOX application may operate within a network or system that is an ecosystem or MOX ecosystem. The MOX application may be deployed on one or more devices, entities or spaces that make up a MOX ecosystem.

According to one embodiment, the MOX system is an application that runs on a mobile device. According to another embodiment, MOX provides a unique user interface with many features. Features of the MOX application can be characterized as user interface (e.g., user experience) features and architectural features. The MOX system incorporates cards. Cards are displayed as visual elements in the user interface that can be manipulated to provide exchange of data, capabilities, and allow for device control. Card elements may be configured as containers.

As used herein, an entity relates to elements that that are recognized and that make up an ecosystem of the application. An entity may relate to a device, space, and users of an application. An ecosystem relates to collections of entities that are associated.

Spaces relate to real and virtual locations that are recognized by the application. By way of example, a space may be assigned to one or more of a room, building, floor, home, office or other physical location (e.g., café, office, etc.). Spaces may also be assigned to virtual locations that do not have a corresponding physical location.

A device can relate to devices configured to execute and run a MOX application. A device can also relate to non-MOX devices. Devices may refer to real and virtual devices.

Architectural aspects of the MOX application relate to the card configuration, platform for operating with mobile device OS, and underlying processes for card exchange functionality.

One embodiment is directed to processes for presentation of a user interface and a device configured to present a user interface, such as MOX, with cards.

Another embodiment is directed to an application platform, processes and devices for operating within a MOX platform. MOX may provide a common UI for multiplatform devices, such as a single unified way to control or know even though devices are not connected. The MOX architecture may include one or more of the following attributes: use of cards as containers, defined card architecture, card based metadata (Json Metadata). MOX may allow for spaces and provide a visual of all spaces based on connection. MOX may include a prioritization algorithm based on proximity, known/history, places with access, etc. MOX may allow for a search of virtual spaces. MOX may be configured with a MOX stack and MOX plugin, and security features. MOX may allow the same card to provide different actions on different devices. MOX may be configured to publish a card into any device (virtual or real).

MOX may operate based on independently defined APIs, which are available via a RESTful interface (similar to the cloud interface). The APIs may be defined by an OEM to support the device.

In certain embodiments, a MOX card itself is an HTML object, containing relevant resources related to color pallet, and branding, as well as the interactive components. Both the front and the back of the card are supplied by the device itself, and are validated by the cloud.

The present disclosure relates to systems, methods, electronic devices and applications for discovering the presence of devices in an ecosystem of devices, establishing communication with other devices in the ecosystem, receiving profile information of the other devices on the network, accessing the capabilities of the other devices on the network, sharing and matching the capabilities of the devices in the ecosystem, and changing the operation of matched capabilities of the other devices in the ecosystem.

In one embodiment, an application layer protocol to obtain certain information of a device that operates the application layer protocol. The obtained information may be bundled in a packet for sharing with other devices operating the same application layer protocol; that is, embodiments of the present disclosure provide a capability of conversing between devices that do not share common core architecture. A benefit of the present disclosure can include permitting individual devices to retain the ability to operate internally on unique communication protocols, but communicate and interact with other devices through a common application layer protocol that does not disrupt the underlying device operation. A further benefit of the present disclosure is permitting programmer flexibility in designing operating platforms for devices and programs without constraining them to a common communication protocol controlling a particular device or program. Still another benefit of embodiments of the present disclosure can include leveraging a network of devices with a plurality of resources and capabilities to free any one device from permanently hosting a given resource or capability. In other words, embodiments of the disclosure enabling sharing between devices by connecting to those with a particular needed, or desired, resource or capability.

One embodiment is directed to a method that includes a first device with an application layer protocol joining an ecosystem of at least one other device operating the same or a compliant application layer protocol. A compliant application layer protocol is capable of interacting and communicating with the application layer protocol despite differences in particular coding or architectural paradigms; hereinafter a compliant application layer protocol and application layer protocol shall have the same intended meaning. In one embodiment, joining the ecosystem is by local network or physical connection. In another embodiment, the first device joins the ecosystem without local network or physical proximity, and instead joins through cloud computing access.

In one embodiment, the first device determines the presence of other devices in an ecosystem through a discovery protocol. In another embodiment at least one other device in the ecosystem is a second device that establishes communication with the first device by delivering a communication socket of the second device to the first device. The communication socket received by the first device, in one embodiment, is the conduit for all subsequent communication between the first device and the second device.

In another embodiment, the first device requests the profile information of the second device. Profile information in one embodiment is a unique identifier preset on the device that distinguishes the device from all other devices supporting the application layer protocol. In other embodiments a profile engine coupled to the device assigns profile information to those devices without preset profile information. In another embodiment, the first device receives profile information delivered by the second device.

In another embodiment, the first device requests capability information of the second device. In one embodiment the first device receives a capabilities request acknowledgment from a second device in the form of a capabilities packet delivered by the second device. In some embodiments, capability information of the second device is embedded in, and received with, the profile information. In still other embodiments, the first device receives new capabilities of a second device that was previously communicated with. In one embodiment, the capabilities of the second device are categorized into capability classes by the application layer protocol.

In another embodiment, the capabilities of the first device and the second device are matched. Matched capabilities of a first device and second device enable a user of the first device to remotely interact with and operate the matched capabilities of the second device. In one embodiment, the remote interaction with the second device is through an interface generated by the application layer protocol on the first device.

In still other embodiments, device interaction is enabled by user accounts. In these embodiments, a user account takes the place of a first device and functions akin to a virtual device. A user account may access an ecosystem from a platform that does not host the application layer protocol of the ecosystem. For example, a user account configured to operate the application layer protocol is accessed through a mobile device (such as by cloud account or webpage login); though the mobile device itself does not support the application layer protocol the user may perform the functions related the disclosures herein through the user account.

In one embodiment, a user account accesses an ecosystem and transmits a discovery protocol to determine the presence of other devices in the ecosystem. Access of an ecosystem by a user account varies according to various embodiments and may be by physical connection, network connection, or cloud connection. In some embodiments, a user account stores the profiles and capabilities of certain previously connected devices and provides interaction protocols. Embodiments utilizing a user account permits communication with certain devices remotely through a user interface.

Other embodiments comprise systems for discovering the presence of devices in an ecosystem of devices, systems for establishing communication with other devices in the ecosystem supporting a common application layer protocol, systems for exchanging profile and capability information of devices in the ecosystem, and systems for matching the capabilities of devices in the ecosystem to enable remote operation of a device in the ecosystem.

Still other embodiments comprise systems for creating a user account to access an application layer protocol, systems for accessing ecosystems of devices supporting common application layer protocols through the user account, systems for identifying the profiles and capabilities of devices in the ecosystem, and systems for operating the capabilities of the identified devices through the user account As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

One embodiment is a method that includes a first device with an application layer protocol joining an ecosystem with at least one other device by network or physical connection. According to one embodiment, an ecosystem comprises a plurality of devices supporting a common application layer protocol. In another embodiment, an ecosystem comprises virtual devices. Virtual devices vary according to various embodiments, but comprise devices that are selectively connected to the ecosystem, platforms or devices that do not operate the application layer protocol but may still connect to a common network, or user account. A virtual device may access an ecosystem from a platform that does not host the application layer protocol of the ecosystem. In one embodiment, a virtual device is connected to an ecosystem by a device operating the application layer protocol, but the virtual device is not controlled subsequent to that connection. Illustrative examples of accessing a virtual device include bar code scanning, photograph or image recognition, manual entry, and radiofrequency identification or nearfield communication tags. Though the disclosure herein describes primarily devices operating the application layer protocol, one having skill in the art will recognize the applicability of virtual devices as alternatives in the various embodiments disclosed.

In one embodiment, the application layer protocol is configured to interact within an internet protocol network stack. In certain embodiments, the application layer protocol extracts existing standards and values employed by devices operating an internet protocol network to create a common device information exchange across variable devices that may not otherwise have those standards and values as core architecture. In one embodiment, the application layer protocol identifies complementary function endpoints between devices.

In one embodiment, a first device connects to devices within an ecosystem through a discovery and pairing engine coupled to the first device. In one embodiment, the discovery and pairing engine determines the presence of, and announces its presence to, other devices in an ecosystem and requests communication with other devices in the ecosystem by transmitting a discovery protocol. In one embodiment, the discovery protocol is transmitted in a user datagram protocol (UDP) packet to any and all other devices in the ecosystem. The UDP enables reception of the transmission by devices without prior identification to or communication between the first device and other devices. In one embodiment the UDP packet in the discovery protocol comprises at least one line of the following coding sequence:
DISCOVER
IPADDR: 10.200.18.32
MACADDR: 1c:cl:de:bb:cd:be
UUID: 4e507115-41d5-45cf-b888-36aada5029f7
TIMEOUT: 1000
DATE: 2015-03-15 15:31:10-920

In another embodiment, the discovery and pairing engine receives a response to the discovery protocol from at least one other device in the ecosystem. The at least one other device is referred to as a second device hereinafter, though responses from multiple devices (in other words a third device, fourth device, etc.) are of course possible. In one embodiment, the discovery and pairing engine receives a communication socket of the second device as a response to the first device discovery protocol. The discovery and pairing engine establishes communication between the first device and second device through the received communication socket. In one embodiment, the discovery and pairing engine is programmed to receive unicast UDP of other devices, similar to the discovery protocol transmitted to determine presence of an ecosystem. In one embodiment, the unicast UDP contains configuration information for communication or interaction between the second device and the first device. In some embodiments, the configuration information establishes a transmission control protocol by internet protocol (TCP/IP) for all subsequent communication between the second device and the first device. In one embodiment, the sequence code describing the first device UDP packet applies to the unicast UDP packet delivered by, and received from, the second device.

In another embodiment, the first device requests the profile information of the second device. Profile information in one embodiment is a concise representation of a device in terms of the information required to uniquely identify and describe the device within the ecosystem. In one embodiment, the profile information further comprises static capabilities supported by the device. In one embodiment, the profile request comprises at least one line of the following coding sequence:
"device_profile":
"device_uid": "_",
"device_class": "_",
"device_manufacturer": "_",
"device_model": "_",
"device_default_name": "_",
"device_friendly_name": "_",
"zone_uid": "_",
"capabilities_uri": "_"
"MOX_version": "_"

In one embodiment, the profile information is generated from a configuration file provided by a device manufacturer. In another embodiment the profile information is provided by a globally unique identifier (GUID) generator. In one embodiment the profile information is generated by a profile engine. In these embodiments, the profile engine generates and assigns profile information for future profile identification to those devices without preexisting or preset profile information that operate the application layer.

In one embodiment, a profile engine comprises a device module to create a device profile for the device. According to various embodiments, the device module creates a device profile from a manufacturer or vendor configuration file, from an external profile database (for example, as provided by schema.org and accessed through cloud connection), from a configuration file from the application layer protocol, or from the device itself by an indexing function. In other embodiments the device module is coupled to a configuration parser to extract profile values from the various profile creation methods and construct a profile information packet. In one embodiment, the profile information packet is a Java Script Object Notation (JSON) formatted file. In other embodiments, the profile engine comprises a profile emitter for transmitting the profile information packet to other devices or to a storage bank hosted by the application layer protocol.

Profile information is deterministic; that is, profile information is constant and may be regenerated at any time regardless of operation of the application layer protocol. In one embodiment the profile information is coupled to a physical address; in other embodiments the profile information is embedded on other constant attributes of the device.

The profile information, as provided by a manufacturer, GUID, or generated by a profile engine according to previously described various embodiments, includes at least one of a unique identifier (universally unique within the ecosystem), device class (described in further detail below), device manufacturer, device model, device default name (a human readable name), device friendly name (a default name generated by a user of the device), zone identification (grouping of devices and described in further detail below), version of the application layer protocol supported by the device, and a capabilities uniform resource identifier (URI) configured to retrieve capabilities of a device.

According to various embodiments, device class of a profile conforms to at least one of mobile (for example, smartphones or tablets), television (to include smart TV like HiSense), personal computer (for example, laptops, desktops, and workstations), audio (for example, home theaters, stereo systems, or music players), wearable (for example, smart watches, glasses, fitness monitors), appliance (for example, refrigerators, microwaves, dishwashers, air conditioners or heating systems, washers or dryers, coffee makers, ovens, and the like), or fixtures (for example, thermostats, lighting systems, security systems, smoke or other detectors, garage door openers, window coverings, and the like).

In one embodiment, zone identification is a globally unassigned zone until the device is paired with other devices. In another embodiment, the user of a device is a zone itself. In other embodiments, zones are groupings of devices based on their location; zones are further broken down to subgroupings in other embodiments. As an illustrative example only, in one embodiment a zone is a residence comprising all devices operating the application layer protocol in the residence, with a subgrouping zone of rooms within the residence such as an office comprising devices with the application layer protocol located within that office. In another embodiment, temporary zones are created when the discovery and pairing engine recognize proximity of devices in the ecosystem without a static relation to the zone. As an illustrative example of a temporary zone, a user attends a conference and enters the temporary zone with other devices that operate the application layer protocol; though the conference is populated with devices that will not remain at the conference beyond a limited duration, a temporary zone incorporating the present devices is created.

Zone identification in one embodiment is through pairing with other devices already in the zone. For example, in one embodiment a first device enters a zone and connects with two other devices that have the zone "home" in the profile information, the first device is then added to the "home" zone as well. In another embodiment, the first device joins the highest common parent zone between a plurality of connected devices; that is if a plurality of devices are members of several groupings or subgroupings of zones, a first device will by default join the highest hierarchical zone shared between the plurality of connected devices. Zone identification in another embodiment is by device association; in one embodiment the profile engine assigns a zone to the device based on profile information such as device class, manufacturer and model. In another embodiment the manufacturer or vendor of the device presets a zone for the device. For example, in one embodiment a refrigerator is preset for a zone identification of "kitchen" and in another embodiment a profile engine references the model number of a particular manufacturer to a database, such as an internet catalog accessed, to determine the device is a toaster and assigns a zone identification of "kitchen."

In one embodiment, zones have unique security requirements dictating which devices may join the zone. In other embodiments, zones have unique authentication requirements dictating how a device may join a secured zone. Methods of authentication include, but are not limited to, third party authentication, device credentials such as metadata enabled card elements on the device, or a confirmation of the capabilities of the device.

According to one embodiment, the first device receives the profile information of a second device through the established connection between the devices. As disclosed previously, in one embodiment the established connection is through TCP/IP socket connection. According to one embodiment, the received profile information populates all requested profile request fields. For example, an merely for illustrative purposes, in one embodiment the returned profile information for a television conforms to the following coding sequence to mirror the sequence of the profile information request:

"device_profile":
"device_uid": "f47ac10b-58cc-4372-a567-0e02b2c3d479",
"device_class": "CLS_IV"
"device_manufacturer": "Hisense",
"device_model": "led55k600x3d",
"device_default_name": "VIDAATV",
"device_friendly_name": "Family_Room_TV",
"zone_uid": "fc94417c-05db-46bf-9a92-5a399a2a86c1",
"capabilities_uri": "MOX://f47ac10b-58cc-4372-a567-0e02b2c3d479/capabilities",
"MOX_version": "1.0.1"

In one embodiment, the first device requests capability information of the second device. In another embodiment, the first device recognizes the profile of the second device as a previously connected device; in these embodiments the capability information request of the first device to the second device is a request for any updated capabilities of the second device since the last connection between the devices. In one embodiment, the capabilities request comprises at least one line of the following coding sequence:

"capabilities":
"capability_uid": "_",
"capability_name": "_"
"state_fields": "_"
"content_types": "_"
"capability_api_uri": "_",
"capability_cards_uri": "_", "capability_card_ui": "_",
"capability_callbacks": "_",
"capabilities_uri": "_"

In one embodiment, capabilities are intrinsic to the device; in another embodiment, capabilities are extrinsic. Intrinsic capabilities comprise functions of a device inherent to the class of the device and in some embodiments require the hardware or firmware included in the device. Though intrinsic capabilities may not always operate due to runtime system needs, intrinsic capabilities are immutable and may always be enabled. Illustrative and non-exhaustive examples of intrinsic capabilities include Wi-Fi sharing or brightness controls of lighting systems. Extrinsic capabilities comprise functions the device may perform given external contribution; the device may not perform extrinsic capabilities on its own. Illustrative and non-exhaustive examples of extrinsic capabilities include following news feeds of external sources, receiving updates to certain social media outlets, or accessing information of mobile applications present on a device.

Capabilities may be further classified as active or passive according to some embodiments. Active capabilities are those denoting a change in the state of the device before and after interaction. Illustrative and non-exhaustive examples of active capabilities include changing the brightness setting of a lighting system or changing the channel of a television. Passive capabilities are those that do not change a state of the device before and after interaction. Illustrative and non-exhaustive examples of passive capabilities include providing Wi-FI access, using shared wireless credentials, or adding followers to a social media outlet. In the example of adding a follower to a social media outlet, this represents an extrinsic passive capability; the information of a certain follower is external to the device, but the function to add a follower does not change the state of the device.

According to some embodiments, capabilities may further be static or dynamic. Static capabilities are predetermined and reflect the manufacturer or vendor preferences. In one embodiment, static capabilities are included in a configuration file provided by the manufacturer or vendor. Dynamic capabilities are those determined during runtime and may be broader than manufacturer or vendor design specifications.

In one embodiment, capabilities of a device are aggregated for exchange with other devices in an ecosystem by a dynamic capability engine. Aggregated capabilities include all capabilities of a device, whether intrinsic or extrinsic, active or passive, or static or dynamic. In alternative embodiments, the capabilities of a device, whether intrinsic, extrinsic, active, passive, static or dynamic are compiled in a capabilities module of a profile engine and are part of a device's profile information. In one embodiment, capabilities are represented as a JSON array. According to certain embodiments, capabilities are further divided into classes. Capabilities classes include, but are not limited to, control (interacting with the active state of a device), Digital Living Network Alliance (DLNA) functions, Wi-Fi connectivity, data storage, and social media manipulation.

According to one embodiment, the dynamic capability engine makes runtime determinations of capabilities, for example determining what external factors are present to enable extrinsic capabilities, of a device and aggregates them with static capabilities of a device to deliver a capabilities packet to other devices in an ecosystem. The dynamic capability engine comprises a cloud module to access external enabling factors for external capabilities, capability detection plugin to detect particular capabilities at runtime, a plugin module to register or remove capabilities as required, and a capability emitter to aggregate and create a capabilities packet for sharing with other devices in an ecosystem. A capability detection plugin may operate any number of, if any, runtime capabilities such as DLNA server access, or house modules for anticipated runtime capabilities such as Wi-Fi access.

In another embodiment, the first device receives a capabilities packet from a second device acknowledging the capability request. In still other embodiments, the application layer protocol detects numerous devices on a single network and restricts capability requests by a first device, or reception of capabilities packets from second devices, until certain profile information of devices on the network are received. In such embodiments, specific requests for specific devices with certain profiles may filter out certain devices, and the first device will not accept communication with the non-specified devices to enhance the speed of communication with specified devices. In still other embodiments, second devices provide or update the first device with new capabilities (or capability callbacks) to a first device that was previously communicated with, in lieu of a complete capabilities packet. For example, and merely for illustrative purposes, in one embodiment of a received capabilities packet for at least two capabilities of a second device, the coding sequence conforms to the following:

```
"capabilities" :
"capability_uid" : "d5a97264-7fd55a86220e",
"capability_name" : "CAP_CONTROL_STATE"
"state_fields" : ["brightness", "power_on_off"],
"capability_api_uri" : "MOX://device_uuid/ d5a97264-7fd55a86220e/state/api",
"capability_cards_uri" : "MOX://device_uuid/ d5a97264-7fd55a86220e/state/cards",
"capability_card_ui" : "MOX://device_uuid/ d5a97264-7fd55a86220e/state/cards/control",
"capability_callbacks" : "MOX://device_uuid/ d5a97264-7fd55a86220e/state/callbacks",
"capabilities_uri" : "MOX:// f47ac10b-58cc-4372-a567-0e02b2c3d479/capabilities"
},
{
"capability_uid" : "558f85a1-ccd4-8209b8e82c81",
"capability_name" : "CAP_SHARE_CONTENT"
"content_types" : ["application/pdf"],
"capability_api_uri" : "MOX://device_uuid/ 558f85a1-ccd4-8209b8e82c81/content/api",
"capability_cards_uri" : "MOX://device_uuid/ d5a97264-7fd55a86220e/state/cards"
```

As noted by the previous illustrative example, a capabilities request may not populate every field of a capabilities request, dependent upon the particular capability. For example, a capability with no updates or callbacks will not return a capabilities packet line with that field populated.

According to some embodiments, the received capabilities of a second device are matched to the capabilities of the first device. In one embodiment, matching is performed by a capabilities matching engine. A capabilities matching engine may be present on any device in the ecosystem, but in one embodiment the capabilities matching engine of the first device performs the matching when connected to a second device. According to one embodiment, the capabilities matching engine establishes the interaction possible between a first device connected to a second device. In one embodiment, the capabilities matching engine determines common operable capabilities between a first device connected to a second device.

In one embodiment, a capabilities matching engine comprises an operable capabilities module. The operable capabilities module is configured to receive the capabilities of a first device and the capabilities of a second device. In one embodiment, the capabilities matching engine identifies those capabilities operable by both of the two devices and produces an operable capabilities packet comprising any matched capabilities, that is, those capabilities operable by both of the two devices. In another embodiment, the capabilities matching engine comprises a capabilities interface module for creating an application program interface (API) interaction for the first device or user of a first device.

According to various embodiments, each matched capability can have one or more operations and those operations may present one or more output parameters. In one embodiment, operating the matched capabilities of a second device is through an interface presented on the first device comprising a JSON array for eligible operations.

Operating the matched capabilities, in one embodiment, is through self-described APIs of connected devices. Self-described APIs, in one embodiment, are subsets of a complete API package necessary to operate the matched capability on a particular device. Through self-described APIs, the common language across devices regardless of manufacturer or programming design is enabled. Self-described APIs share with other devices the elements of the API necessary to interact with a connected device. Self-described API elements comprise, according to various embodiment, the name of the eligible operations, a description of the eligible operations, a method of performing the eligible operations (for example, "GET" to retrieve a data item, "POST" to create or update a collection of data items, "PUT" to create or update a datum, or DELETE" to remove a datum or a collection of data), endpoint (a URI to service the API for the capability of the second device), parameter set (a collection of names or value pairs representing the operational limits of the capability), or return type (such as functions of application program interfaces of connected devices; or methods of receiving feedback from the second device such as a value of output or other status conditions, error codes, or messages).

According to one embodiment, the plugin module of the dynamic capability engine receives unmatched capabilities from the capabilities matching engine. The plugin module in one embodiment locates the capabilities needed to operate the unmatched capability, for example from another device or from cloud storage accessed by the device, and installs it on the first device to operate the previously unmatched capability. In one embodiment, the plugin to operate the previously unmatched capability is permanently registered on the first device by the plugin module; that is, the capability becomes static. In other embodiments the plugin is present during runtime only (the capability is dynamic), an in other embodiments is removed from the first device and will not be present on the first device after connection to the second device terminates.

According to one embodiment, presentation of a matched capability to a first device, or a user of a first device, is through an interface to interact with the capability. In one embodiment the interface is presented automatically upon matching. In another embodiment the interface is presented upon request for a given capability.

In still other embodiments, device interaction is enabled by user accounts. A user account permits communication with certain second devices without requiring a first device. In one embodiment, a user account functions as a virtual first device; one having skill in the art can readily apply the techniques and methods related to a first device to a user account functioning as a virtual first device. In one embodiment, a user account may access an ecosystem from a device that does not operate the application layer protocol. In one embodiment the user account accesses the ecosystem through an interface accessing a cloud network.

Merely by way of illustrative example of the device to device interaction permissible by embodiments of the present disclosure is the following interaction over an application layer protocol. A smartphone enters a residence zone populated with a television and an audio player. Each of the three devices operate audio capabilities. A discovery and pairing engine on the smartphone transmits a discovery protocol in the zone and receives unicast UDPs comprising connection sockets for the television and audio player. The smartphone requests the capabilities of the television and audio player via the connection socket, and receives at least the self-describing API for the audio capabilities of the television and audio player. The capabilities matching engine determines a similar capability on the smartphone for the audio functions of the audio player, but not the television audio capabilities. The dynamic capability engine downloads a plugin for the television's audio capability from an internet source, and the capabilities matching engine matches the dynamic capability for the television audio control recently downloaded to the smartphone with the television audio capability. The smartphone user accesses the controls for the television and audio player through an interface presented by the application layer protocol on the smartphone, and adjusts the volume of the television and audio player such that when the smartphone receives a call the audio output parameters of the television cannot exceed a certain threshold. In such an example, the devices have described their capabilities to one another, have granted access to their controls, have indicated what plugins are necessary to operate their controls, and devices' output is reactive to the needs of other devices.

Referring now to the figures, FIG. 1 depicts a simplified system diagram of system 100 comprising a first device 105 accessing an ecosystem according to one or more embodiments. Based on the application, first device 105 may communicate and interoperate with one or more other devices directly, such as second devices $110_1$, $110_2$, and additional second devices as applicable through $110_n$. According to another embodiment, first device 105 may communicate and interoperate with one or more other devices, such as devices $120_1$, $120_2$, and additional devices as applicable through $120_n$ by way of a communication network 115. In one embodiment, communication network 115 is a local network, in other embodiments communication network 115 is a cloud access point.

First device 105 may be configured to execute an application layer protocol, such as a MOX application providing one or more functions or other application layer protocols. Functions executed by the application layer protocol through first device 105 include, but are not limited to, discovering an ecosystem of second devices $110_1$ through $110_n$ or $120_1$ or $120_n$ by transmitting a discovery protocol from 105 and receiving a communication socket from at least one of second devices $110_1$ through $110_n$ or $120_1$ through $120_n$. Other functions that may be executed by first device 105 on system 100 include requesting a capabilities packet of, and receiving a capabilities packet from, at least one of second devices $110_1$ through $110_n$ or $120_1$ through $120_n$. Still other functions first device 105 may execute on system 100 include matching received capabilities of second devices $110_1$ through $110_n$ or $120_1$ through $120_n$ to capabilities of first device 105 and controlling the operations of the matched capabilities of second devices $110_1$ through $110_n$ or 120₁ through 120ₙ from first device 105 either through direct connection or connection through communication network 115.

Device 105 may be a mobile device, such as a smartphone or tablet computer; a personal computer, such as a desktop or laptop; an accessory device, such as a television or audio player; a wearable device, such as smart watch, smart glasses, or a fitness monitor; an appliance, such as a refrigerator or microwave; a fixture, such as a thermostat or lighting system; or a virtual device, such as a user account. Similarly, any one of second devices 110₁ through 110ₙ or 120₁ through 120ₙ may be a mobile device, such as a smartphone or tablet computer; a personal computer, such as a desktop or laptop; an accessory device, such as a television or audio player; a wearable device, such as smart watch, smart glasses, or a fitness monitor; an appliance, such as a refrigerator or microwave; a fixture, such as a thermostat or lighting system; or a virtual device, such as a user account or bar coded object. One having skill in the art can envision other applicable first device 105 or second device 110₁ through 110ₙ or 120₁ through 120ₙ based on the present disclosure of various embodiments. Although FIG. 1 depicts one device 105 it should be appreciated that system 100 and the application may allow for multiple devices to communicate and interoperate.

Figure 2:
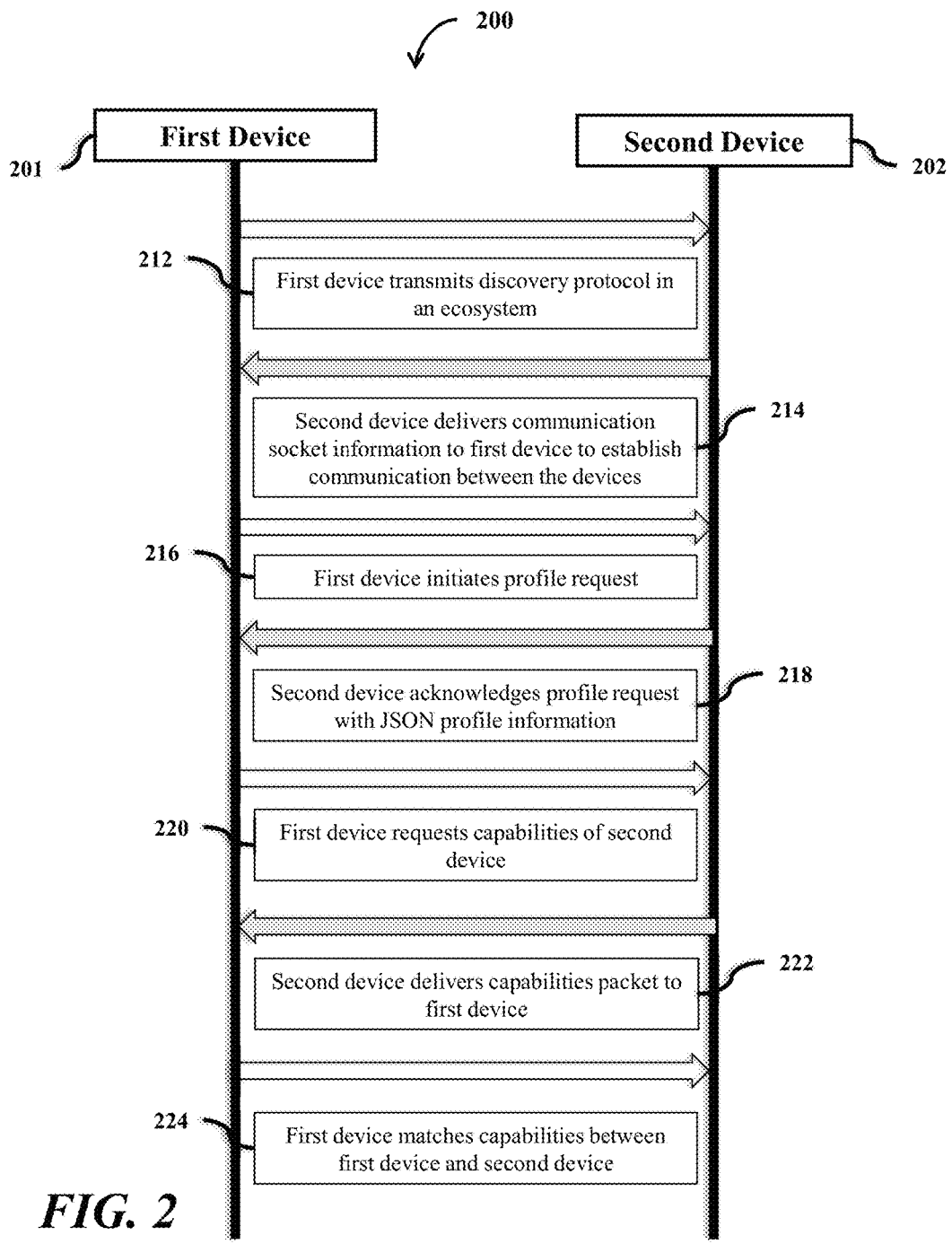
FIG. 2 depicts a diagram of device connection according to one or more embodiments.

FIG. 2 depicts a sequenced interaction 200 between a first device 201 and a second device 202. As illustrated in FIG. 2, first device 201 operating an application layer protocol delivers a discovery protocol at 212 to determine the presence of an ecosystem and determine the presence of any other device in the ecosystem that supports the same application layer protocol or a compliant application layer protocol. As discussed previously, a compliant application layer protocol is capable of interacting and communicating with the application layer protocol despite differences in particular coding or architectural paradigms. For example, a device with barcode may still share information about with a device operating an application layer protocol; a discovery protocol in such an example is a scanner for the bar code. The two devices have therefore communicated despite no exact common application layer protocol.

At 214, at least one second device 202 responds to the discovery protocol of first device 201 and delivers a communication socket to, and is received by, first device 201. The communications socket establishes the method and location of subsequent communication between first device 201 and second device 202.

At 216 first device 201, through the received communication socket, initiates a profile request of second device 202. Second device 202 acknowledges and responds to the profile request with the profile information as preset on second device 202 or as determined by a profile engine on second device 202; at 218 second device 202 delivers the profile information to, and the profile information is received by, first device 201. In one embodiment, and as illustrated in FIG. 2, the profile information is in JSON format, though one having skill in the art can envision appropriate profile information format based on the variety of devices second device 202 may be. For example, profile information in alternative embodiments may be binary code.

At 220 first device 201 requests the capabilities of second device 202; second device 202 responds to the capabilities request 220 by delivering a capabilities packet to first device 201 at 222. In alternative embodiments not shown in FIG. 2, a capabilities packet is part of the profile information of second device 202 received by the first device 201 at 218 and no request 220 or delivery 222 is necessary. In other embodiments not shown in FIG. 2, first device 201 recognizes the profile information of second device 202 received at 218 as a previously connected device and capabilities request 220 is only for capabilities of second device 202 that are new as of the last connection between first device 201 and second device 202. In such embodiments, capabilities packet delivery 222 includes only those new capabilities of second device 202.

At 224, first device 201 matches the capabilities received from second device 202 at 222 to capabilities of first device 201 to permit control of matched capabilities on second device 202 by first device 201.

In still other embodiments of sequence 200, profile request 216 comprises a request for responses only from devices with certain capabilities. Second device 202 responds with profile information in the event that it supports the capability embedded in the profile request. In still other variations of sequence 200, first device 201 has completed step 218 with a plurality of second devices 202, but capabilities request 220 instructs the plurality of second devices 202 to respond only if second devices 202 operate a specific capability.

It should be appreciated that the specific steps illustrated in FIG. 2 provide a particular sequence of interaction between a first device 201 and a second device 202. Other sequences of steps may also be performed according to alternative embodiments. For example, alternative embodiments of the present disclosure may perform the steps outlined above in a different order. Moreover, the individual sequence illustrated in FIG. 2 may include multiple subsequences as appropriate to the individual step or direct sequences between different nodes than as illustrated. Furthermore, additional steps may be added or removed depending on the particular applications. One of ordinary skill in the art would recognize many variations, modifications, and alternatives.

Figure 3:
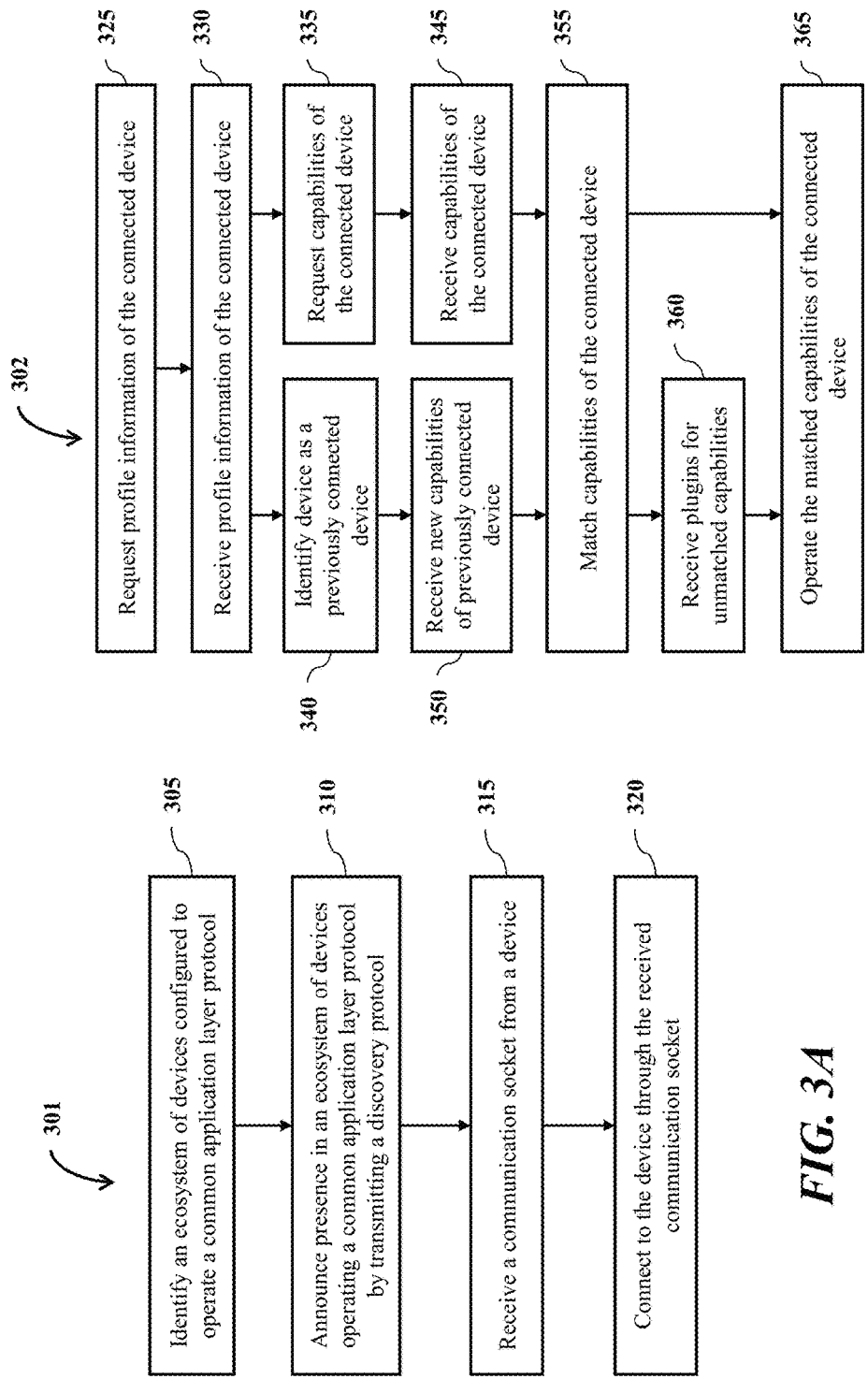
FIG. 3A depicts a process according to one or more embodiments.
FIG. 3B depicts a process according to one or more embodiments.

FIG. 3A depicts an exemplary process 301 for connecting to a device within an ecosystem of devices according to various embodiments of the disclosure. Process 301 may be initiated by a first device operating an application layer protocol. In other embodiments, process 301 may be initiated by a virtual device accessing the application layer protocol through a user account. At 305, an ecosystem of devices is detected by a discovery protocol. In process 301, or any other embodiment discussed throughout this disclosure, discovery protocol transmission may be constantly broadcast by an application layer protocol, or may be selectively broadcast by an application layer protocol. In one embodiment, detection 305 is initiated when a new device is detected by means other than a discovery protocol over an application layer protocol.

At 305, the discovery protocol continues and announces presence in the detected ecosystem at 310; the discovery protocol continues to broadcast a UDP after detecting an ecosystem to establish communication with devices that may be within the ecosystem. At 315 a communication socket is received from at least one device. In one embodiment the at least one device is a second device connecting to a first device or virtual device; in other embodiments the at least one device is a virtual device connecting to a first device or virtual device. The communication socket in one embodiment directs the communication means and location of the at least one device for all subsequent communication with the at least one device. In one embodiment, the communication socket is a TCP/IP packet. At 320 the at least one device is connected to through the received communication socket.

As depicted in FIG. 3B, process 302 is directed to further communication with a device connected by process 301. As with process 301, process 302 may occur between a first device or virtual device and a second device or other virtual device. Process 302 begins at 325 by requesting the profile information of the connected device (whether a second device or virtual device). At 330 the profile information of the connected device is received. In one embodiment, the capabilities of the connected device are requested at 335, and at 345 the capabilities of the connected device are received. In an alternative embodiment, the profile information received at 330 identifies the connected device as one previously connected to and method 302 continues to 340 instead of 335. Following 340, new capabilities, if any, of the previously connected device are received at 350 rather than receive a complete capabilities packet of the connected device.

At 355 the received capabilities, whether from a complete capabilities packet of a newly connected device or an updated capabilities packet of a previously connected device, is matched with the capabilities of the platform that initiated process 302, which may be a first device or a virtual device according to embodiments of the disclosure. At 360, which may not be present in all embodiments, unmatched capabilities are identified and plugins to perform the capability are received; unmatched capabilities are those that are capabilities of the connected device but not a capability of the platform that initiated process 302. The application layer protocol resolves the unmatched capabilities with the received plugin for the unmatched capability, and the matched capabilities (whether initially matched or resolvedly matched by a plugin) are operated on the connected device at 365 by the platform (such as a device or virtual device) that initiated process 302.

It should be appreciated that the specific steps illustrated in FIGS. 3A and 3B provide a particular process 301 of connecting to a device in an ecosystem and process 302 of exchanging device information to enable interaction with a connected device. Other sequences of steps may also be performed according to alternative embodiments. For example, alternative embodiments of the present disclosure may perform the steps outlined above in a different order. Moreover, the individual sequence illustrated in FIGS. 3A and 3B may include multiple sub-sequences as appropriate to the individual step or direct sequences between different nodes than as illustrated. Furthermore, additional steps may be added or removed depending on the particular applications. One of ordinary skill in the art would recognize many variations, modifications, and alternatives.

Figure 4:
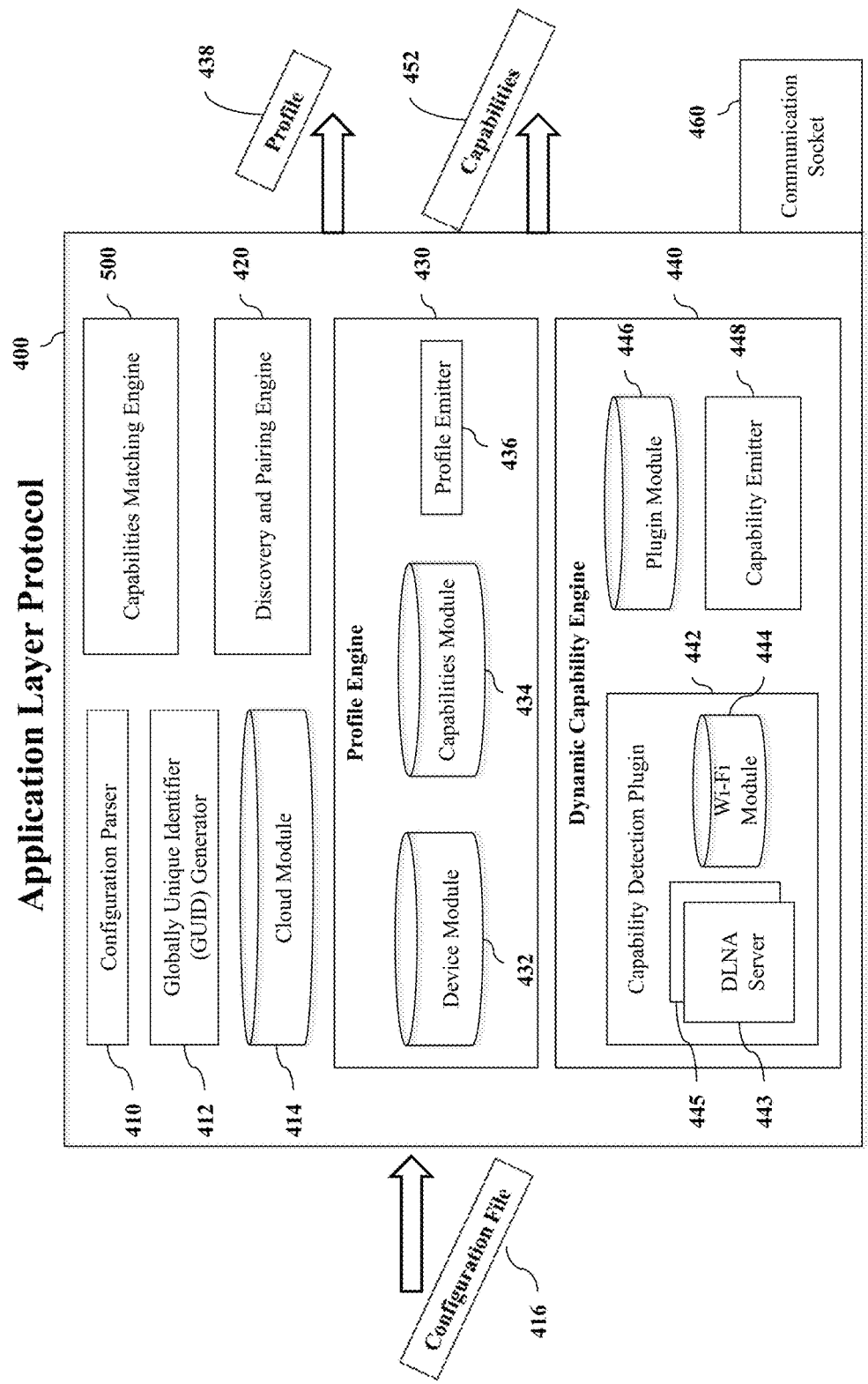
FIG. 4 depicts a graphical representation of an application layer protocol according to one or more embodiments.

FIG. 4 depicts a block diagram of an exemplary embodiment of an application layer protocol 400, such as MOX or other application layer protocol. The application layer protocol 400 comprises a configuration parser 410 to extract values of received data packets, whether received from the device operating the application layer protocol 400 or from a configuration file 416 or from an other source, for subsequent population of those values to other components of, or data packets produced by, application layer protocol 400.

Application layer protocol 400 further comprises, in some embodiments, a globally unique identifier (GUID) generator 412 to assign a unique device or profile identifier to the device operating the application layer protocol 400. Application layer protocol 400 further comprises in certain embodiments, a cloud module 414. Cloud module 414 permits access to an ecosystem through a cloud connection, or in some embodiments supports cloud connection to receive plugins for capabilities or other external resources according to various embodiments. In certain embodiments, communication socket 460 is coupled to application layer protocol 400 to serve as a conduit for communications between devices operating, or supportable by, application layer protocol 400. In one embodiment, communication socket 460 is a TCP/IP address; in another embodiment, communication socket 460 is a hardwire or bus connection.

In some embodiments, application layer protocol 400 further comprises a discovery and pairing engine 420. Discovery and pairing engine 420 initiates detection of an ecosystem of devices and presence of other devices by generating a discovery protocol for broadcast by the application layer protocol 400.

According to certain embodiments, coupled to application layer protocol 400 is a profile engine 430. Profile engine 430 generates a profile of the device operating the application layer protocol 400. Profile engine 430 comprises device module 432, capabilities module 434, and profile emitter 436. Device module 432, in one embodiment, enables profile engine 430 to create a device profile from a configuration file 416, or from an external profile database accessed through cloud module 414. In another embodiment, profile information is created by indexing the device itself to extract values, through coupling with configuration parser 410, from the device those values necessary to create a profile. Configuration file 416 may be provided by a device manufacturer or other vendor or application layer protocol 400 itself, and is coupled to the profile engine 430 in one embodiment to provide values for populating at least one element of profile information file 438 (for example device manufacturer; other profile information elements are previously described in this disclosure).

Capabilities module 434 aggregates all capabilities of a device operating application layer protocol 400, whether intrinsic or extrinsic, active or passive, or static or dynamic. In certain embodiments, capabilities module 434 provides at least one capability of the aggregated capabilities to profile engine 430 as part of profile information file 438. Coupled to device module 432, capabilities module 434, and profile engine 430 is profile emitter 436. Profile emitter 436 receives the profile elements as produced by device module 432 and capabilities module 434 and constructs a single profile information file 438 for export to other devices or to application layer protocol 400. In certain embodiments, configuration parser 410 is coupled to profile emitter 436 to extract profile values and populate a profile information file 438.

Further depicted in FIG. 4 is dynamic capability engine 440. Dynamic capability engine 440 determines capabilities the application layer protocol may access during runtime operations. Coupled to dynamic capability engine 440 is capability detection plugin 442. Capability detection plugin 442 permits operation of any number of runtime capabilities based on the presence of external factors that may enable or enhance certain capabilities of the platform operating application layer protocol 400. Depicted in FIG. 4 are illustrative plugins DLNA server 443, Wi-Fi module 444, and at least one unassigned plugin 445. Capability detection plugin 442 may have a plurality of unassigned plugins 445, depending on the embodiment, that populate a dynamic capability engine 440 during runtime.

Dynamic capability engine 440 further comprises a plugin module 446. Plugin module 446 registers plugin capabilities to operate during runtime and, in one embodiment, removes plugin capabilities during periods other than runtime. In one embodiment, plugin module 446 accesses external sources to enable extrinsic capabilities of the platform operating application layer protocol 400. According to one embodiment, plugin module 446 further receives at least one unmatched capability from capabilities matching engine 500. Plugin module 446 is configured to locate through, in one embodiment, cloud module 414 the capability needed to operate the at least one unmatched capability. Plugin module 446 in other embodiments locates the necessary plugin to complement the unmatched capability identified by capability matching engine 500 from other devices connected to the application layer protocol 400. Plugin module 446 delivers the plugin to dynamic capability engine 440 for operation at least during runtime to enable matching with the unmatched capability identified by capability matching engine 500.

Dynamic capability engine 440 further comprises a capability emitter 448. Similar to capabilities module 434 in profiling engine 430, capability emitter 448 aggregates all capabilities of a device operating application layer protocol 400, whether intrinsic or extrinsic, active or passive, or static or dynamic. In alternative embodiments, capability emitter 448 aggregates only those capabilities requested by an external source such as a device or virtual device; in still other embodiments capability emitter 448 aggregates new capabilities acquired by the platform operating application layer protocol 400 since the platform last connected with a certain device. Capability emitter 448 creates a capabilities packet 452 for exchanging with other devices or platforms. In certain embodiments, configuration parser 410 is coupled to capability emitter 448 to extract capability values and populate a capabilities packet 452 with capabilities specifications such as control or data storage.

Figure 5:
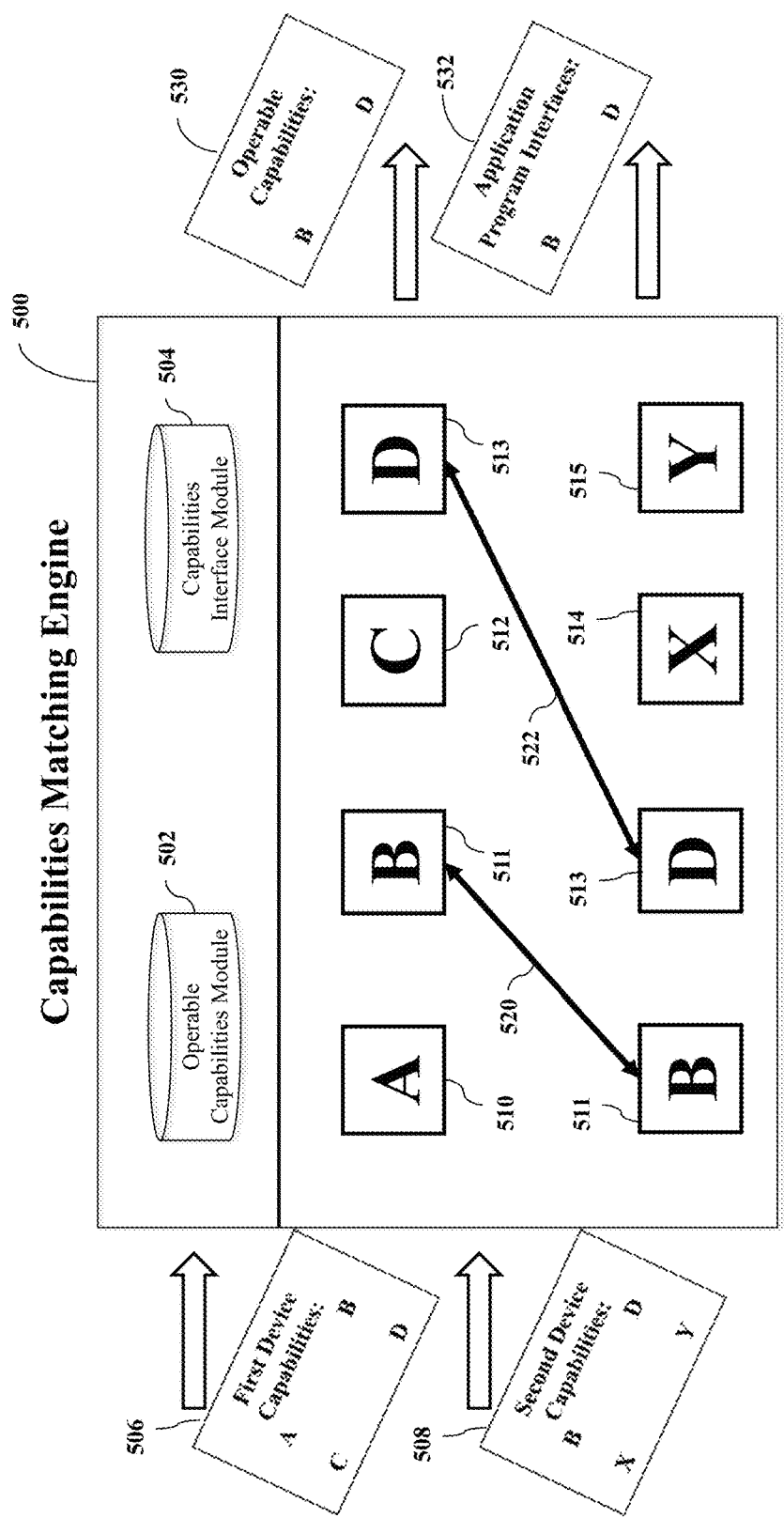
FIG. 5 depicts engines according to one or more embodiments.

Application layer protocol 400 further comprises a capability matching engine 500. Capability matching engine 500 is depicted in greater detail in FIG. 5. FIG. 5 depicts a block diagram of a capabilities matching engine for pairing capabilities of at least two devices. As illustrated in FIG. 5, in one embodiment the capabilities matching engine 500 comprises an operable capabilities module 502 configured to receive a first device capabilities packet 506 and a second device capabilities packet 508. As discussed with other embodiments, a first device in alternative embodiments is a virtual device, such as a user account; a second device may also be a virtual device such as a user account.

In one embodiment, the first device capabilities packet 506 comprises representative first device capability A 510, B 511, C 512, and D 513; first device capabilities packet 506 may comprise fewer or greater capabilities according to various embodiments. In one embodiment, the second device capabilities packet 508 comprises representative second device capability B 511, D 513, X 514, and D 515; second device capabilities packet 508 may comprise fewer or greater capabilities according to various embodiments. Operable capabilities module 502 identifies representative capability B 511 as a matched capability 520 and identifies representative capability D 513 as an additional matched capability 522. Operable capabilities module 502 creates an operable capabilities packet 530 comprising matched representative capabilities B 511 and D 513 and presents them to capabilities interface module 504.

In one embodiment, capabilities interface module 504 constructs an application program interface packet 532 for the matched capabilities embedded in operable capabilities 530. Capabilities interface module 504 presents the application program interfaces to application layer protocol 400, as depicted in FIG. 4, to enable interaction of the matched capabilities B 511 and D 513 through the platform operating application layer protocol 400.

In alternative embodiments, and as discussed previously, unmatched representative capabilities of the second device X 514 and Y 515 are delivered to plugin module 446, as depicted in FIG. 4, for accessing capability plugins necessary to match representative capabilities X 514 and Y 515 for inclusion in operable capabilities packet 530 and subsequent interaction with representative capabilities X 514 and Y 515 by a device through application layer protocol 400. In one embodiment, the capability plugin includes the API of the unmatched capability.

Figure 6:
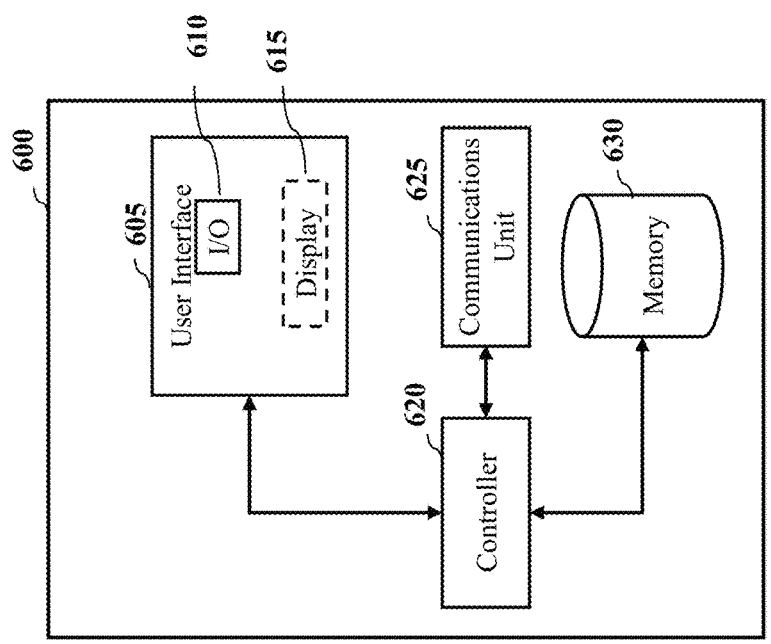
FIG. 6 depicts a simplified diagram of a device according to one or more embodiments.

FIG. 6 depicts a simplified diagram of a device according to one or more embodiments. Device 600 may relate to one or more devices for providing an application, such as a MOX application. According to another embodiment, device 600 may relate to one or more devices configured to run a MOX core. In one embodiment, device 600 relates to a device including a display, such as a TV, mobile device, or device having a display in general. According to another embodiment, device 600 may be devices, such as a set-top box, configured to output content to a display device. According to another embodiment, device 600 may be devices without a display. As shown in FIG. 6, device 600 includes controller 605, graphical user interface 610, communications unit 615 and memory 620.

Controller 605 may be configured to execute code stored in memory 620 for operation of device 600 including presentation of a graphical user interface. Controller 605 may include a processor and/or one or more processing elements. In one embodiment controller 605 may be include one or more of hardware, software, firmware and/or processing components in general. According to one embodiment, controller 605 may be configured to perform one or more processes described herein. Graphical user interface 610 may be configured to receive one or more commands via an input/output (I/O) interface 625 which may include one or more inputs or terminals to receive user commands. When device 600 relates to a TV, I/O interface 625 may receive one or more remote control commands.

Controller 605 may be configured to run a MOX application, the MOX application including one or more card elements, restful APIs, a MOX core and a MOX configuration.

Communications unit 615 may be configured for wired and/or wireless communication with one or more network elements, such as servers. Memory 620 may include non-transitory RAM and/or ROM memory for storing executable instructions, operating instructions and content for display.

Figure 7:
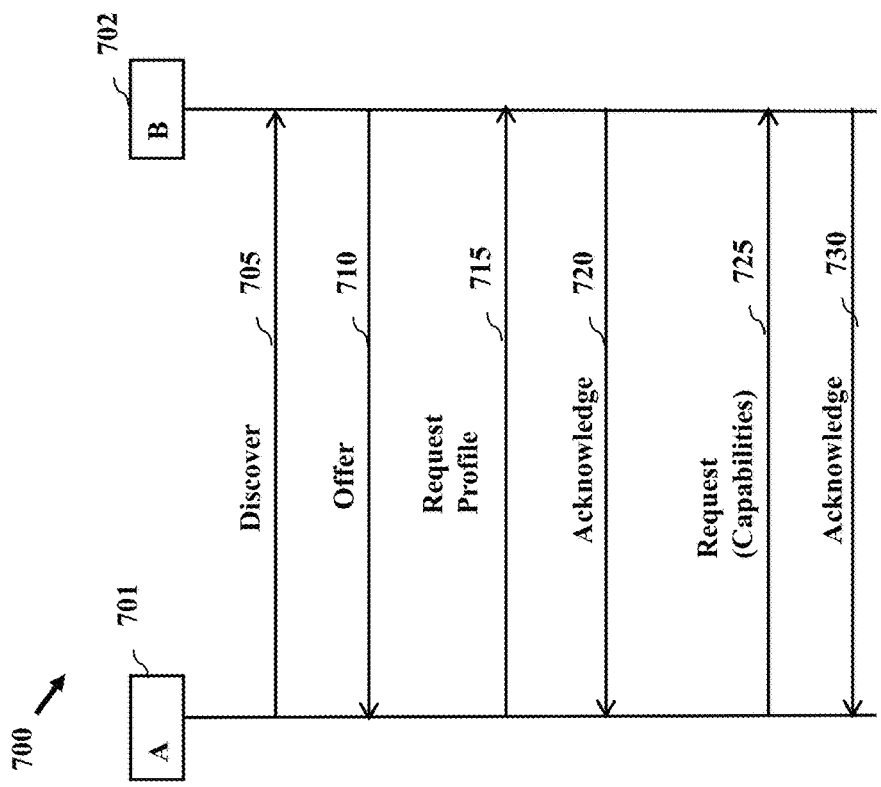
FIG. 7 depicts a graphical representation of device discovery and pairing according to one or more embodiments.

FIG. 7 depicts a graphical representation of device discovery and pairing according to one or more embodiments. According to one embodiment, devices running an application, such as a MOX application, and/or devices executing a MOX core can allow for communication between the devices and exchange of data for one or more functions. FIG. 7 depicts process 700 for device discovery and pairing. Discovery between devices or entities having a MOX core can allow for device capabilities and services within an ecosystem of devices running the MOX application. Process 700 may also be employed for resource sharing.

Process 700 may be employed by a device, such as a MOX device, to identify devices associated with one or more entities or zones. In certain embodiments, process 700 relates to a identification of devices and services within an ecosystem, such as a personal ecosystem.

Process 700 is depicted relative to entities A and B, shown as entities 701 and 702, respectively. Process 700 may be performed by engines and functionality of an application executed by each of entities 701 and 702, such as a MOX application. Accordingly, process 700 may be performed without necessarily requiring user input. Process 700 may allow for devices associated with a particular account, user, location (e.g., physical, virtual, etc.), zone, or entity to exchange capabilities, pair, allow for control, etc. Transmissions/exchange messages in process 700 may be performed by one or more of local short range communication, local network communication, network communication in general and combinations thereof.

Process 700 may relate to a conversation between devices based on the core elements included by a MOX application of each device. By way of example, process 700 may relate to device pairing. Process 700 may employ a DORA-RA process (e.g., Discover, Offer Request, Acknowledge, Request, and Acknowledge). Entity 701 can transmit discover message 705 which can be received by entity 702. Discover message 705 may be sent periodically by way of local short range transmissions and/or via one or more network protocols including wired and wireless communications. Discover message 705 may employed to determine if any devices are available for communication with entity 701 via the application, such as a MOX application. When discover message 705 is received by entity 702, offer message 710 may be transmitted by entity 702 to entity 701. Offer message 710 may provide a response to notify that another device is present. Request profile message 715 may query a device's profile. Acknowledge 720 may provide a response including the device profile that is configured according the MOX application. Process 700 may be performed by a profiling engine of the MOX application to ensure that a device profile is present. If the profile is not complete at the time of discovery, the profiling engine can complete the broadcast. The profile can contain based information on device type and device ID. The profile may provide a contact for device 702. Discovery and pairing of the two devices may initially be handled by UDP, while capability exchange may be handled via TCP.

Request capabilities message 725 may query device capabilities. Message 725 may be handled either lazy, or on demand if the device is selected for interaction prior to being analyzed. Acknowledge 730 may provide a response including the device capabilities according the MOX application. Capabilities which are fetched outline what a device is capable of performing.

Process 700 may be used for obtaining an IP address, and for obtaining a PXE boot image file name when the DHCP server and PXE server reside on the same physical machine. Pairing and subsequent booting are completely transparent. Discovery and pairing for two devices using process 700 may be handled, at least initially, via UDP. Capability exchange may be handled via TCP.

Process 700 provides resource sharing among devices. Interaction between devices 701 and 702 allows for a common language (e.g., MOX application), self description of device capabilities, devices can describe APIs, interactions, and capabilities. In that fashion, devices can understand complementary capabilities, and make use of related capabilities. Devices can also react to the needs of other devices. For MOX enabled devices, RESTful APIs are presented in a manner that explains what the devices do, and how they can be used. The devices themselves provide the card and interaction point for control. The interaction point for control can be customized based on templates, and include branding.

Figure 8:
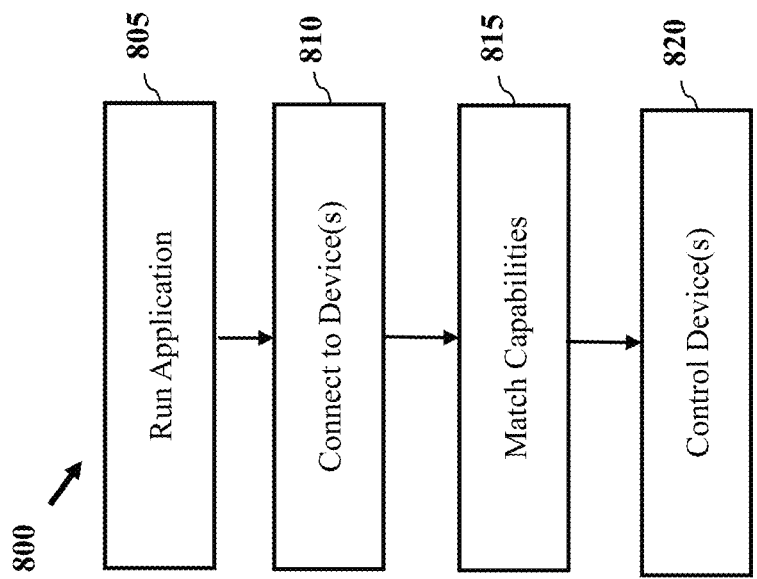
FIG. 8 depicts a process according to one or more embodiments.

FIG. 8 depicts a process for device to device control according to one or more embodiments. Process 800 may be executed by one or more device types. Moreover, process 800 is not limited to a particular device or platform operated by a device. As such, devices with different platforms, or no platforms (e.g., devices with processors) can communicate and allow for control. By way of example, a microwave and a lamp may each be configured to run a version of a MOX application. Despite being devices with entirely different functions, and applications, the devices may employ the MOX application to communicate, for control and to exchange commands.

Process 800 may be initiated by executing an application at block 805, such as an application configured to provide the device connection and interoperability with at least one other device associated with the application. In one embodiment, the application is a MOX application. Running a MOX application on a device can allow for the device to notify other devices running MOX that the device is present in one or more locations (e.g., geographic, physical, virtual, zone, etc.). The MOX application run by each device may be different, such that some devices run applications with additional features or capabilities. Running a MOX application may relate to configurations for a processor and/or an application run on a platform of a device. The application executed at block 805 operates on a platform executed by the device, the application configured to provide control and command relative to one or more other devices and to interoperate with one or more platforms of the one or more other devices.

At block 810, the device establishes a connection with a second device, wherein the second device is identified to the device by the application. Establishing a connection at block 810 can include discovery of the second device by the first device, reciting profile data for the second device by way of the application and receiving capabilities of the second device by way of the application. Establishing a connection may be based on a communication socket received form a device and/or established by a MOX application.

At block 815, the device determines one or more capabilities of the second device based on a capability matching of the application, wherein determining is based on an application profile for the second device and capabilities output by the second device. The one or more capabilities of the second device are at least one of a function performed by the second device, information detected by the second device and communication configuration for the second device.

At block 820, the device controls an operation based on one or more matched capabilities, wherein a command is exchanged relative the device and second device by way of communication protocols established by the application. The operation based on one or more capabilities can include transmission of a command by the device to the second device to request information detected by the second device. Operation based on one or more capabilities includes controlling the first device operation based on data received from the second device.

Controlling at block 820 may be based on the application formatting commands from the first device with plugins for the control of the second device. In one embodiment, controlling includes modifying operation based on information and data received from the second device. For example, when a first device includes a function, data and control provided by that device may be exchanged with another device. Controlling can include transmitting data detected by the device to the second device. By way of example, a microwave may include a light sensor and a lamp may include a brightness setting. In one embodiment, configuring the devices to run a version of MOX on their controller can allow for the devices to exchange profile information and capabilities. Profile information may include a universal identifier, location, etc. Capabilities may include the functions and data that may be generated or detected by each device. By exchanging profile information, capabilities and running MOX each device may be configured to interoperate. For example, the microwave may be configured to inform the lamp of the brightness and request for the brightness to be changed. The MOX application can convey the request and package request to be read by a controller of the lamp. This feature and other functions may apply to any device configured to run the MOX application. Process 800 can include device and second device sharing resources based on the connection. For example, a device including a sensor can share the sensor output with another device. Similarly, control aspects of particular devices may be shared or controlled by another device.

While the disclosure has been described in terms of particular embodiments and illustrative figures, those of ordinary skill in the art will recognize that the disclosure is not limited to the embodiments or figures described. The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings and/or examples making apparent to those skilled in the art how the several forms of the disclosure may be embodied in practice.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the disclosure can be practiced with modification and alteration within the spirit and scope of the appended claims. The description is not intended to be exhaustive or to limit the disclosure to the precise form disclosed. It should be understood that the disclosure can be practiced with modification and alteration and that the disclosure be limited only by the claims and the equivalents thereof.

What is claimed is:

1. A method for device to device control, the method comprising:
   executing, by a device, an application configured to provide the device connection and interoperability with at least one other device associated with the application;
   establishing, by the device, a connection with a second device, wherein the second device is identified to the device by the application;
   determining, by the device, one or more capabilities of the second device based on a capability matching of the application, wherein determining is based on an application profile for the second device and capabilities output by the second device; and
   controlling, by the device, an operation based on one or more matched capabilities, wherein a command is exchanged relative the device and second device by way of communication protocols established by the application.

2. The method of claim 1, wherein the application operates on a platform executed by the device, the application configured to provide control and command relative to one or more other devices and to interoperate with one or more platforms of the one or more other devices.

3. The method of claim 1, wherein establishing includes a discovery of the second device by the first device, reciting profile data for the second device by way of the application and receiving capabilities of the second device by way of the application.

4. The method of claim 1, wherein the one or more capabilities of the second device are at least one of a function performed by the second device, information detected by the second device and communication configuration for the second device.

5. The method of claim 1, wherein the operation based on one or more capabilities includes transmission of a command by the device to the second device to request information detected by the second device.

6. The method of claim 1, wherein the operation based on one or more capabilities includes controlling the first device operation based on data received from the second device.

7. The method of claim 1, wherein controlling is based on the application formatting commands from the first device with plugins for the control of the second device.

8. The method of claim 1, wherein the device and second device share resources based on the connection.

9. The method of claim 1, wherein controlling includes modifying, by the device, operation based on information and data received from the second device.

10. The method of claim 1, wherein controlling includes transmitting data detected by the device to the second device.

11. A device comprising:
    a controller configured to
    execute an application configured to provide the device connection and interoperability with at least one other device associated with the application;
    establish a connection with a second device, wherein the second device is identified to the device by the application;
    determine one or more capabilities of the second device based on a capability matching of the application, wherein determining is based on an application profile for the second device and capabilities output by the second device; and
    control an operation based on one or more matched capabilities, wherein a command is exchanged relative the device and second device by way of communication protocols established by the application.

12. The device of claim 11, wherein the application operates on a platform executed by the device, the application configured to provide control and command relative to one or more other devices and to interoperate with one or more platforms of the one or more other devices.

13. The device of claim 11, wherein establishing includes a discovery of the second device by the first device, reciting profile data for the second device by way of the application and receiving capabilities of the second device by way of the application.

14. The device of claim 11, wherein the one or more capabilities of the second device are at least one of a function performed by the second device, information detected by the second device and communication configuration for the second device.

15. The device of claim 11, wherein the operation based on one or more capabilities includes transmission of a command by the device to the second device to request information detected by the second device.

16. The device of claim 11, wherein the operation based on one or more capabilities includes controlling the first device operation based on data received from the second device.

17. The device of claim 11, wherein controlling is based on the application formatting commands from the first device with plugins for the control of the second device.

18. The device of claim 11, wherein the device and second device share resources based on the connection.

19. The device of claim 11, wherein controlling includes modifying, by the device, operation based on information and data received from the second device.

20. The device of claim 11, wherein controlling includes transmitting data detected by the device to the second device.

* * * * *